United States Patent [19]
Fowler

[11] 3,963,138
[45] June 15, 1976

[54] CANE PLANTER
[75] Inventor: Larry G. Fowler, Belle Glade, Fla.
[73] Assignee: Sugar Cane Growers Cooperative of Florida, Belle Glade, Fla.
[22] Filed: Mar. 10, 1975
[21] Appl. No.: 557,169

[52] U.S. Cl. ................................. 214/519; 198/83; 214/83.36; 111/2
[51] Int. Cl.² .......................................... B60P 1/38
[58] Field of Search ................. 214/17 D, 519, 520, 214/521, 522, 83.26, 83.32, 83.36; 198/80, 83; 222/278; 111/2, 3

[56] References Cited
UNITED STATES PATENTS

| | | | |
|---|---|---|---|
| 2,743,932 | 5/1956 | Wester | 214/83.26 X |
| 3,047,173 | 7/1962 | Raney | 214/519 |
| 3,344,830 | 10/1967 | Longman | 111/3 X |
| 3,520,434 | 7/1970 | Destefan et al. | 214/519 |

*Primary Examiner*—Albert J. Makay
*Attorney, Agent, or Firm*—Mason, Fenwick & Lawrence

[57] ABSTRACT

A trailer vehicle having a storage bin for storing a large quantity of cane seed piece segments is disclosed with removal conveyor means carrying the cane segments forwardly to first and second distribution conveyors which convey cane segments to opposite sides of the vehicle where they are deposited on dropping conveyors extending along each side of the vehicle which drop the can segments into furrows beneath the dropping conveyors; rotary levelling means are provided above the distribution and dropping conveyors for providing an even feeding of the cane segments and orientation of the cane segments is maintained by flexible rubber curtain members through which the cane segments fall from the dropping conveyors into the furrow.

8 Claims, 7 Drawing Figures

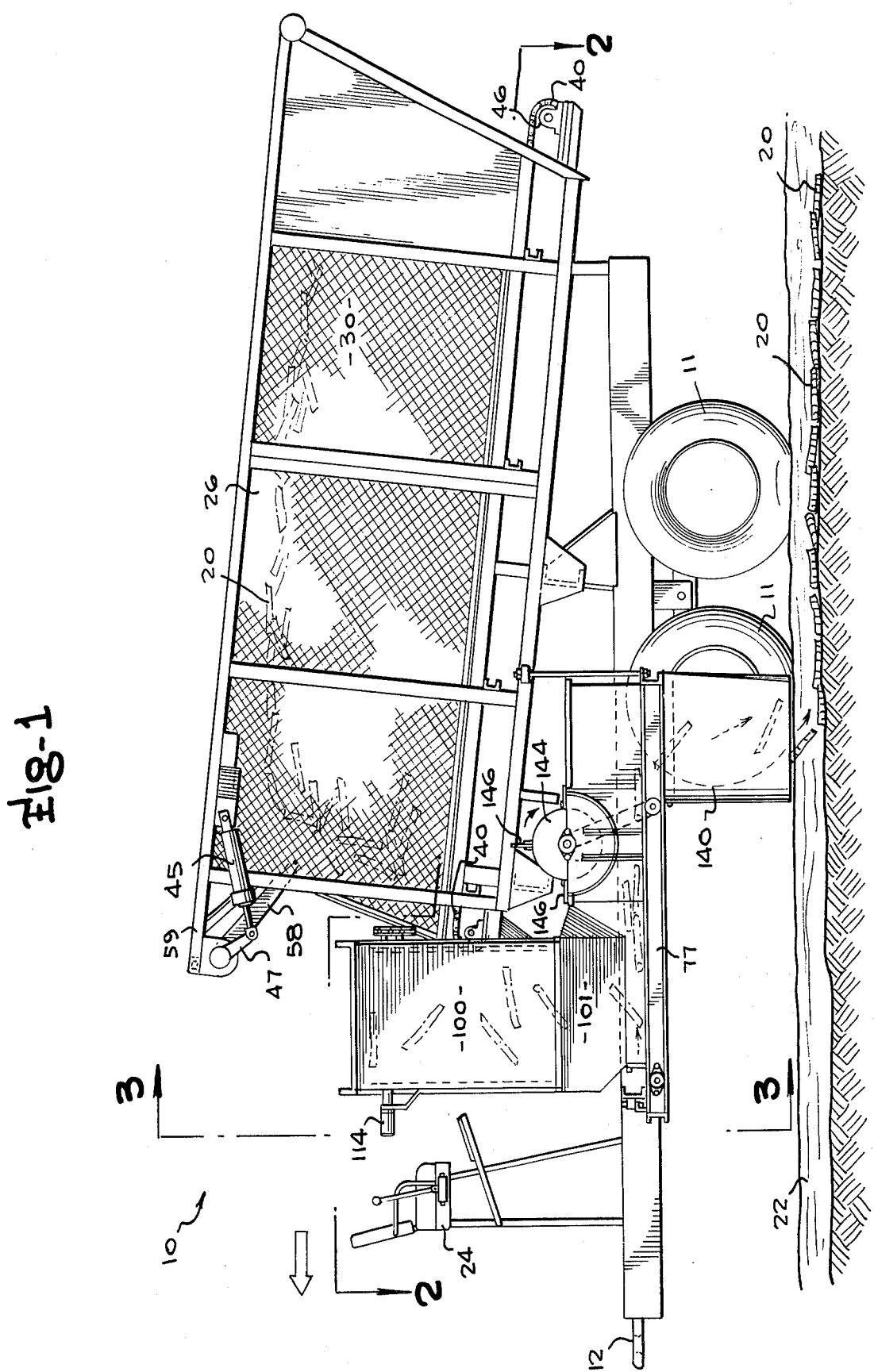

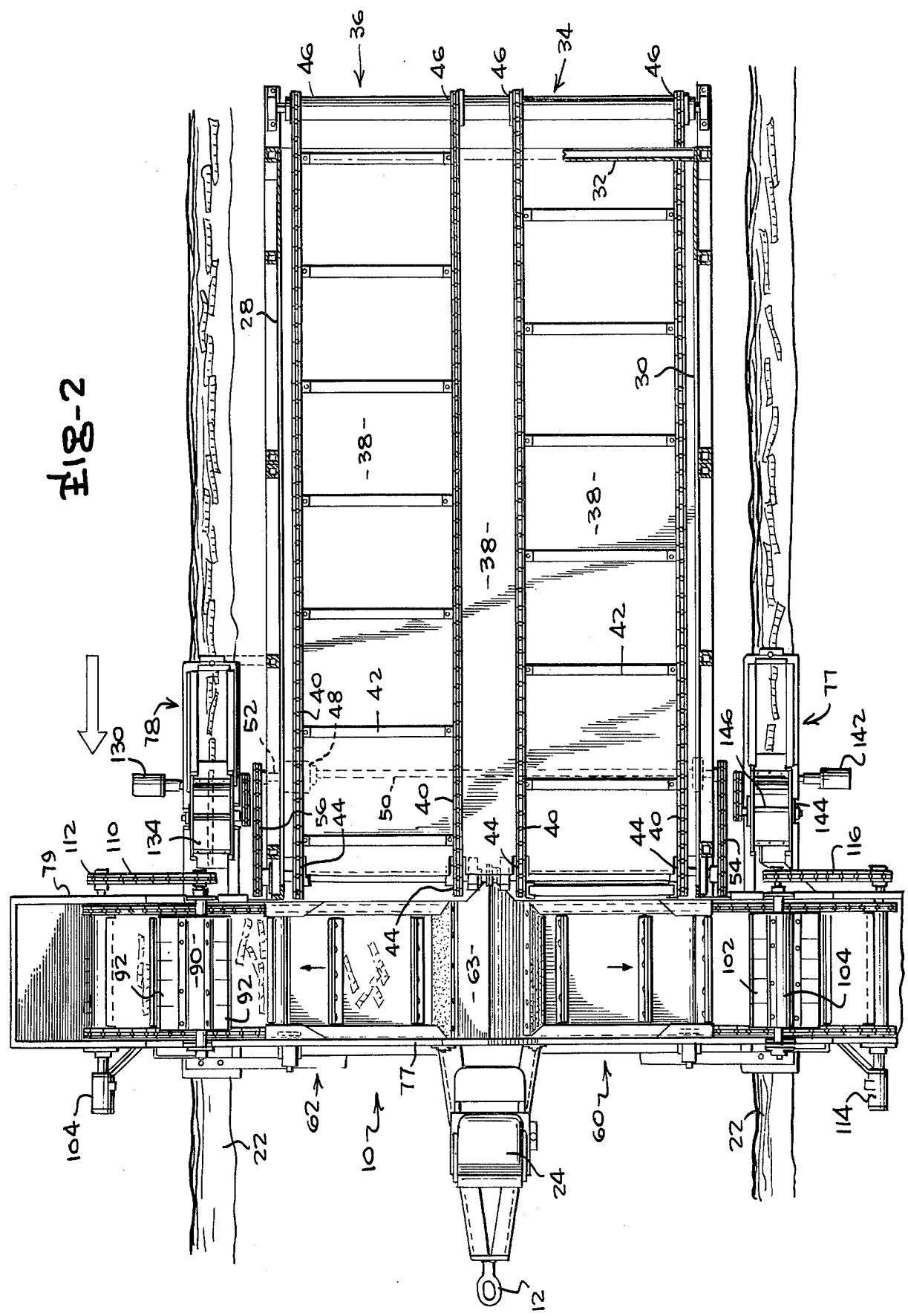

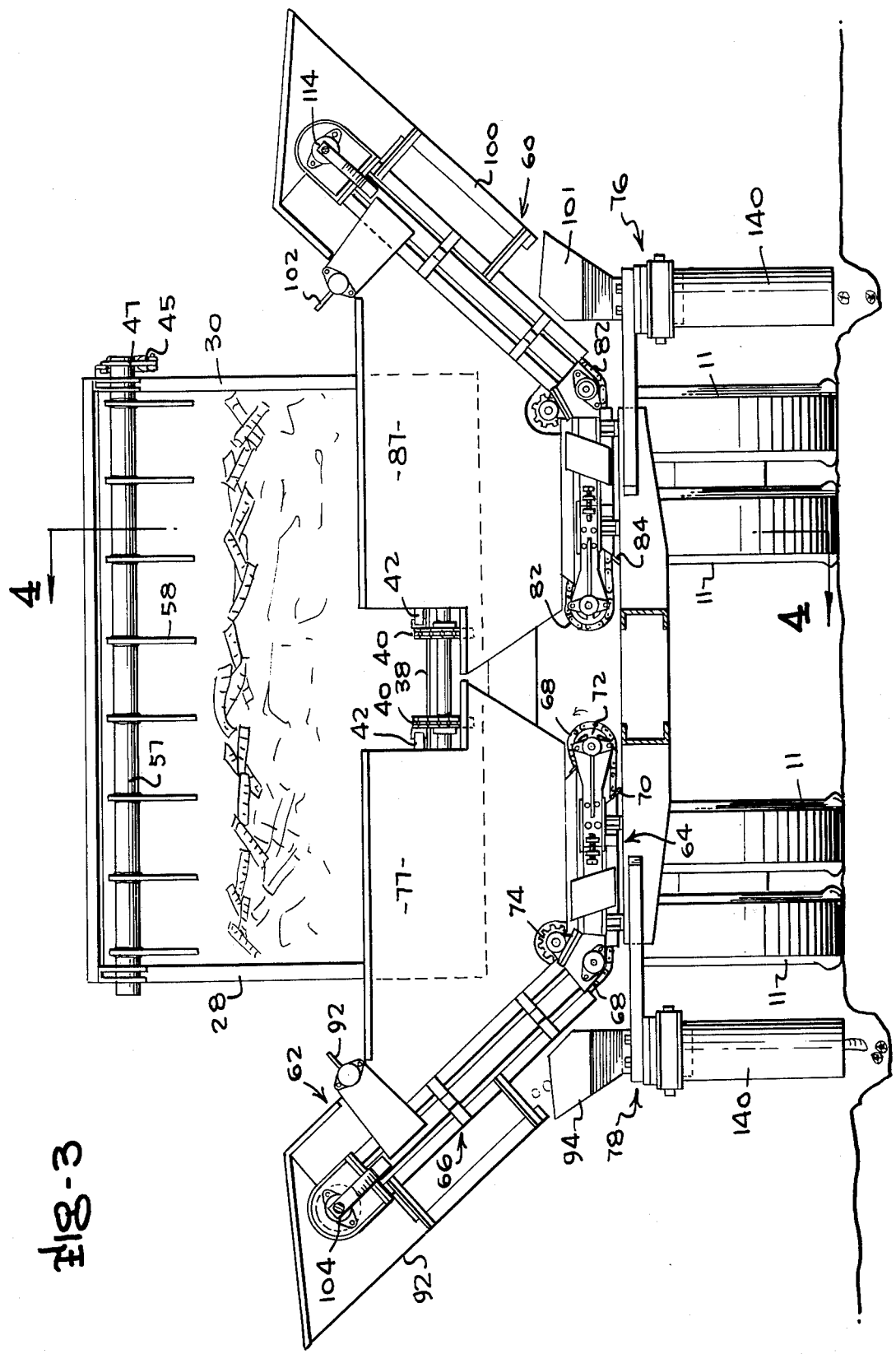

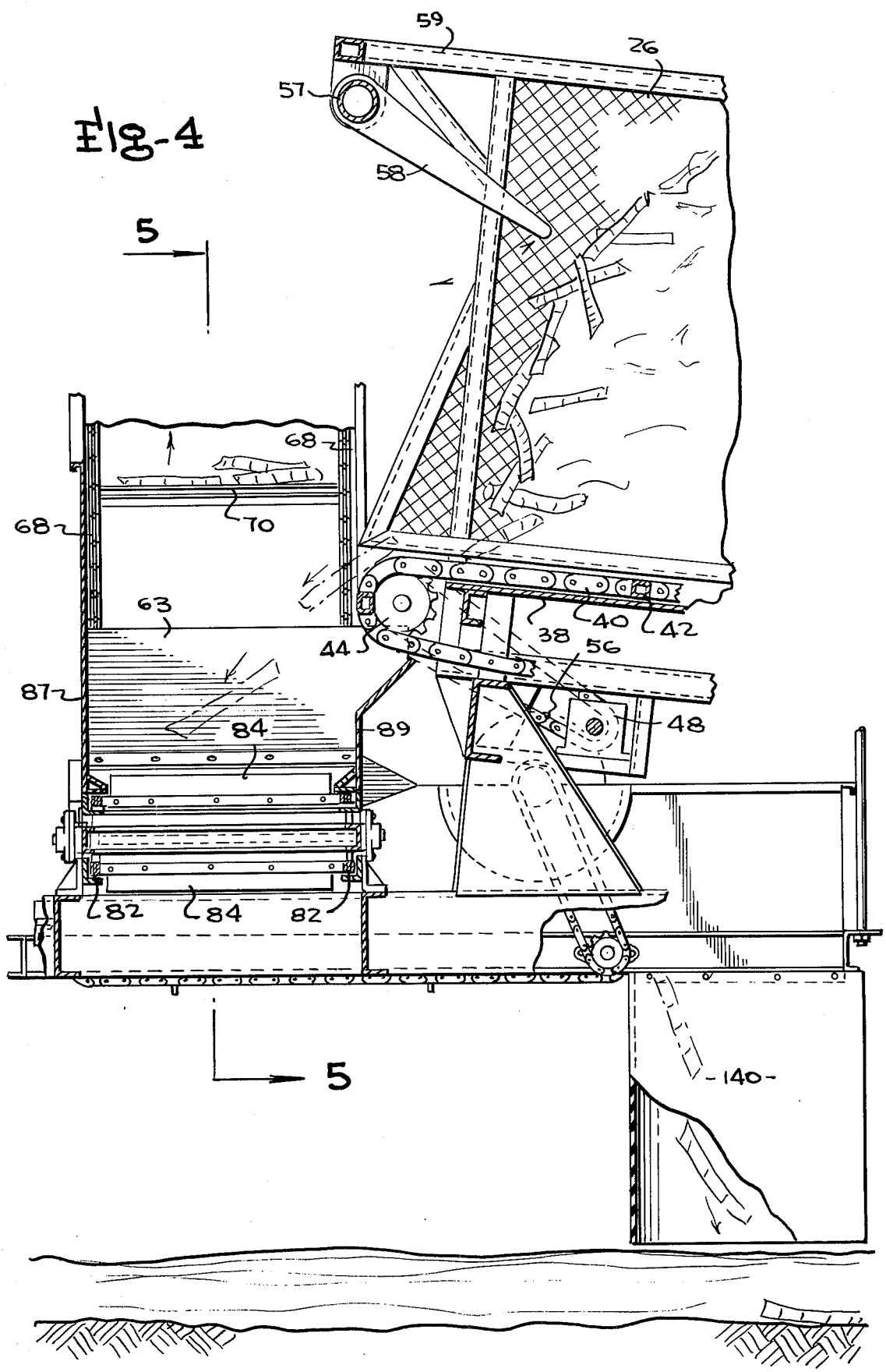

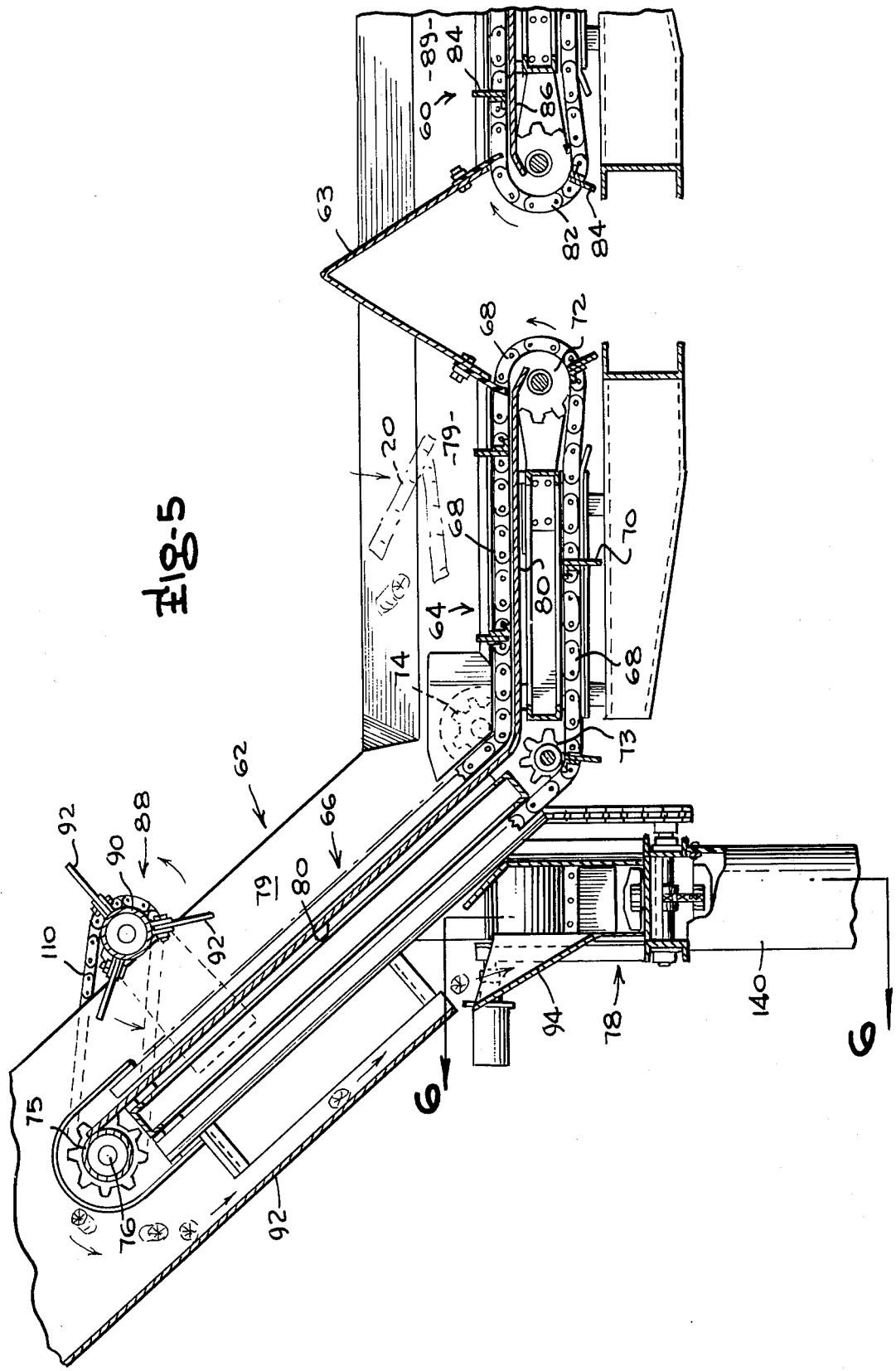

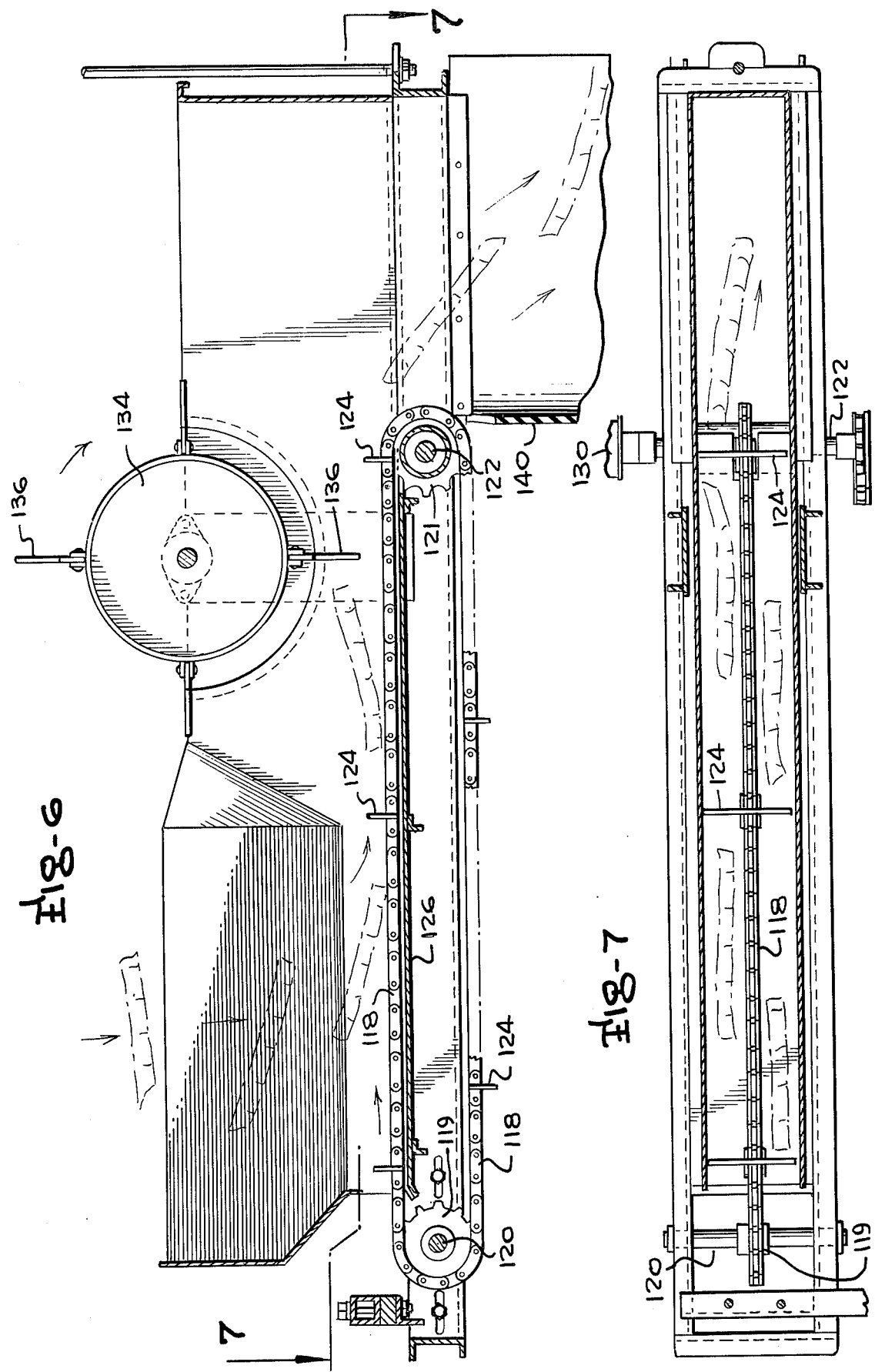

CANE PLANTER

This invention is in the field of agricultural equipment and is more specifically directed to the field of planting apparatus for planting cane seed piece segments in a field.

Sugar cane is propagated by the placing of cane seed piece segments of several inches in length in a furrow followed by the covering of the furrow and the eventual sprouting of the cane segments to provide a new crop. It is highly desirable that the cane seed piece segments be oriented parallel to the furrow and be distributed along the length of the furrow as evenly as possible.

It has been the prior practice to effect the planting of cane seed piece segments manually or with the use of trailers or the like on which workers ride and place the cane segments in the furrow as the vehicle moves across the field along the length of the furrows. Both procedures are undesirable in that they are time consuming and require a substantial amount of labor.

While others have attempted to devise apparatus for effecting the mechanization of the cane seed piece positioning in the furrows, prior known devices for this purpose have not proven to be satisfactory in that they have not always provided a uniform rate of planting and have frequently been susceptible to mechanical malfunction due to the clogging and buildup of cane segments in the apparatus.

It is highly desirable that the cane seed piece segments be subjected to as little physical manipulation as possible in order to avoid damage to the segments which might impair their sprouting ability.

Therefore, it is the primary object of this invention to provide a new and improved cane planting apparatus.

Yet another object of the subject invention is the provision of a new and improved cane planter requiring a miniumum amount of labor for operation.

The foregoing objects are obtained by the preferred embodiment of the invention which is basically a trailer type vehicle having a relatively large storage bin in which a large quantity of cane segments can be provided. The bottom of the storage bin includes a pair of conveyor flights which are pulled across the floor of the storage bin by drive chains connected by slats which effect a forward movement of the cane segments outwardly of the open front end of the storage bin from which the cane segments fall onto the upper surfaces of distribution conveyor means extending transversely to the vehicle. Cane segments falling on the distribution conveyor means are moved to the right or left side of the vehicle and are oriented during the moving process by movement upwardly along an inclined conveyor leg portion from the upper end of which they are gravitationally deposited on an inclined slide plate to slide downwardly onto one or the other of two dropping conveyors extending along both sides of the trailer type vehicle.

The dropping conveyors are operated by hydraulic motor means and continuously move the cane segments toward the rear of the vehicle to fall off the trailing end of the dropping conveyors and subsequently fall downwardly between the side walls of a flexible rubber curtain which are spaced closer together than the length of the cane segments. Consequently, the cane segments are oriented parallel to the furrows in which they are deposited.

Levelling means provided above the distribution conveyors and above the dropping conveyors with each of the levelling means comprising a driven rotary support member from which a plurality of flexible rubber vanes or the like extend to engage any pileup of cane segments on the conveyors for effecting an even feeding of the cane segments along both the distribution and dropping conveyors. Consequently, an even feeding of the cane segments is provided with the cane segments being oriented in the proper manner as they are deposited in each of the furrows extending alongside the vehicle.

Another feature of the invention resides in the provision of an operator's control station position forwardly of the distribution conveyors at a sufficiently high elevation as to permit the operator to view the entire operation. The operator controls all of the components of the device including a plurality of kicker arms mounted radially on a transversely extending pivot shaft extending above the discharge end of the open storage bin. A hydraulic cylinder is operable for oscillating the kicker arms to engage the upper surface of the pile of cane segments in the storage bin to dissipate any tangles and effectively move the upper portions of the pile onto the distribution conveyors.

A better understanding of the invention will be achieved when the following description is considered in conjunction with the appended drawings in which:

FIG. 1 is a side elevation view of the preferred embodiment;

FIG. 2 is a sectional view taken along lines 2—2 of FIG. 1;

FIG. 3 is a sectional view taken along lines 3—3 of FIG. 1;

FIG. 4 is a sectional view taken along lines 4—4 of FIG. 3;

FIG. 5 is a sectional view taken along lines 5—5 of FIG. 4;

FIG. 6 is a sectional view taken along lines 6—6 of FIG. 5; and

FIG. 7 is a sectional view taken along lines 7—7 of FIG. 6.

Attention is initially invited to FIG. 1 which illustrates the preferred embodiment and which basically comprises a trailer type vehicle 10 supported on wheels 11 and having a forward hitch 12 to permit towing across the surface of a field for depositing seed cane segments 20 in parallel furrows 22 (FIG. 2).

Control of the various parts of the planter is maintained by an operator on a rearwardly facing seat 24 provided at an elevated position to enable viewing of all of the operative components of the apparatus.

A cane storage bin 26 having side walls 28 and 30 and a rear wall 32 occupies the rear portion of the trailer vehicle. Cane storage bin 26 is of sufficient size to enable the carrying of a large quantity of cane seed segments for planting large fields without the necessity of frequent stops to replenish the supply of seed cane segments. Seed cane segments in storage bin 26 are conveyed forwardly by removal conveyor means comprising first and second removal conveyors 34 and 36, extending longitudinally along the length of the trailer and each having an upper flight movable along the surface of the floor 38 of the storage bin 26.

Each of the removal conveyors 34 and 36 comprises a pair of sprocket chains 40 between which transversely extending slats 42 are provided for movement across the upper surface of the floor 38. Chains 40 are supported by front sprocket members 44 and rear sprocket members 46. Drive for the conveyor chains 40 is provided by a hydraulic motor 48 (FIGS. 2 and 4) driving oppositely extending axially aligned power output shafts 50 and 52 which have sprockets on their outer ends to respectively drive transmission chains 54 and 56 which, in turn, drive the shafts supporting the front sprockets 44 to provide a resulting rear to front movement of the upper flight of each of the conveyors 34 and 36. Consequently, the body of cane segments in the storage bin 26 is slowly moved forwardly out the open front of the storage bin from which the cane segments fall onto transversely extending distribution conveyor means 60 and 62 positioned adjacent to the forward edge of the storage bin.

A tangle dislodging apparatus comprising a transversely extending shaft 57 having radial arms 58 is mounted on standards 59 above the forward or discharge end of the removal conveyors 34 and 36. A hydraulic cylinder 45 is connected to an actuator arm 47 keyed to the outer end of the shaft 57 so that actuation of cylinder 45 can effect an oscillating reciprocation of the arms 58 to dislodge and disperse any cane tangles or piles approaching the discharge end of the storage bin. Additionally, operation of the arms 58 serves to direct cane segments off the top forward end of the pile of cane in the storage bin onto the distribution conveyor means 60 and 62 to be discussed.

The distribution conveyor means comprises a first distribution conveyor 60 and a second distribution conveyor 62 which are separated by an inverted V-shaped cane deflector 63 and are each respectively positioned to receive cane segments from removal conveyor 34 and removal conveyor 36. Distribution conveyor 62 consists of an inner horizontal conveyor leg 64 and an outer upwardly inclined conveyor leg 66 illustrated in FIG. 5. Conveyor 62 includes parallel spaced chain members 68 connected by transverse slats 70 with the chain members being guided by sprockets 72, 73, 74 and 75. The upper flight of horizontal conveyor leg 64 extends between sprockets 72 and 74, while the inclined conveyor leg portion extends sprockets 74 and 75 as illustrated in FIG. 5. The upper flight of both conveyor legs rides across a support sheet 80 (FIG. 5). A front wall 77 and a rear wall 79 are provided adjacent the front and rear sides of conveyor 62 to insure that the cane segments are deposited on, and remain on, the conveyor.

Similarly, distribution conveyor 60 is identical to above-discussed distribution conveyor 62 and is in mirror relation thereto. Conveyor 60 includes parallel chains 82, transverse slats 84 connected between chains 82, a support sheet 86 supporting the upper flights of the chains before effecting the conveying function and front and rear walls 87 and 89 respectively (FIG. 4).

A cane leveller 88 comprising a rotary support 90 having flexible rubber flaps or vanes 92 is mounted above and adjacent the upper end of the inclined conveyor leg 66 for engagement with cane segments moving up the conveyor to dislodge any cane tangles or piles and maintain an even flow of cane segments 20 up the conveyor. The cane segments fall from the upper end of the conveyor onto a chute slide 92 (FIG. 5) extending downwardly beneath the inclined leg 66 and having a lower, slightly offset leg 94 for guiding the cane segments onto the second dropping conveyor 78.

The first distribution conveyor 60 has an associated chute slide 100, 101 of identical construction to the chute slide 92, 94. Conveyor 60 is also provided with a cane levelling means including flexible radial members 102 formed of rubber or the like mounted for rotation on a rotary member 104.

Drive for the distribution conveyors is identical for each conveyor with conveyor 62 being driven by a hydraulic motor 104 drivingly connected to the shaft 76 on which the sprocket 75 is mounted with a transmission chain 110 connected to a sprocket 112 on the opposite end of shaft 76 providing rotary drive to the cane levelling means 92 as illustrated in FIG. 5.

Similarly, a hydraulic drive motor 114 drives conveyor 60 and the leveller means 104 through a chain 116 (FIG. 2) and in a manner identical to the manner in which the components of conveyor 62 are driven by motor 104.

The construction of the identical first and second dropping conveyors 77 and 78 is best illustrated in FIG. 6 which is directed to the details of the second dropping conveyor 78. More specifically, a chain 118 is mounted on sprockets 119 and 121 on shafts 120 and 122 respectively with a plurality of transverse slats 124 being connected to the chain as best illustrated in FIGS. 6 and 7. The upper flight of the chain 118 rides on a support plate 126 and moves from left to right as illustrated in FIGS. 6 and 7. A hydraulic drive motor 130 is drivingly connected to shaft 122 for driving the chain 118 and for also driving a cane levelling means comprising a rotary drum 134 from which radially extended flexible flaps or vanes 136 extend for engaging any cane members extending above a predetermined level above the upper flight of the conveyor to regulate the number of cane segments being fed outwardly by the dropping conveyor. A downwardly extending flexible rubber curtain 140 is mounted adjacent the discharge end of the conveyor as shown in FIG. 6 and has side walls spaced apart a distance less than the length of the cane segments for guiding the cane segments downwardly into the furrow so that they are deposited with their axes extending generally in alignment with the furrow.

Dropping conveyor 77 is of identical construction to that of conveyor 78 and includes a hydraulic drive motor 142 and cane levelling means comprising a drum 144 having vanes 146 for maintaining even feed of cane segments by the conveyor member.

In operation, the storage bin 26 is filled with cane segments 20 and the vehicle is moved across the surface of the field by a towing tractor in a direction parallel to the furrows 22 with the hydraulic motors 48, 104, 114, 130 and 142 being actuated to provide operation of the various conveyor and levelling components.

The cane mass carried in the storage bin 26 is slowly moved forward by the operation of the slats 42 and the cane segments fall onto the upper surface of the horizontal conveyor leg portions of the distribution conveyors 60 and 62. As the cane segments move up the inclined conveyor leg portions of the conveyors 60 and 62, they are oriented by gravity and slats 70 and 84 in generally parallel relationship to the furrow 22 and it will therefore be apparent that the inclined conveyor leg components provides an orientation of the cane segments. Additionally, operation of the levelling means 90, 92 and 102, 104 helps to provide a relatively even feeding of the cane segments up over the discharge end of the inclined conveyor leg portion of each of the conveyors 60, 62.

The cane segments fall from the upper end of the inclined conveyor leg components onto the chute slide members 92 and 100 to slide down the length of the chute slide members onto the respective dropping conveyors 77, 78. The cane falling on the dropping conveyors maintains its orientation originally provided by the inclined conveyor leg portions of the distribution conveyors and is moved from left to right (rearwardly with respect to the vehicle) beneath the levelling means 144, 146 above conveyor 77 and the levelling means 134, 136 above conveyor 78. Consequently, any undesirable buildup of cane on the dropping conveyors is eliminated by the rotation of the levelling means and the cane segments are uniformly fed at approximately the same intervals off of the end of the conveyors to fall downwardly between the side walls of the rubber curtain 140. The rubber curtains and side walls of conveyors 77 and 78 are closer together than the length of the cane segments to maintain the alignment of the cane segments with the furrows so that the cane segments are deposited in the two furrows in alignment with the furrows as best illustrated in FIG. 2.

The arms 58 can be oscillated continuously during operation of the apparatus or they can be selectively operated under the control of the operator only when needed. Since all of the conveyors and their associated levelling means are within easy view of the operator from his position on seat 24, the entire operation is continuously monitored to provide an effective and trouble-free positioning of the cane segments in the furrows with a minimum amount of labor being necessary for the overall operation. Consequently, it will be seen that the preferred embodiment of the invention enables an achievement of the objects of this invention in an expeditious and economical manner. However, it should be understood that the spirit and scope of the invention is not to be limited to the preferred embodiment since numerous modifications will undoubtedly occur to those of skill in the art, and the mets and bounds of the invention should be determined solely by the appended claims.

I claim:

1. A field operated cane planter for depositing cane seed piece segments in first and second parallel furrows, said planter comprising a movable vehicle, storage bin means on said vehicle for holding a mass of cane segments, removal conveyor means for continuously removing cane segments from said storage bin means, distribution conveyor means extending transversely of said vehicle positioned adjacent said storage bin means for receiving cane segments from said removal conveyor means and operable for conveying said cane segments to the sides of said vehicle, first and second dropping conveyors respectively extending along opposite sides of said vehicle for receiving cane segments from said distribution conveyor means and depositiong the cane segments in one of said furrows and drop guide means associated with each of said dropping conveyor means for guiding said cane segments as they fall from the dropping conveyor means into the furrows to cause the cane segments to be oriented generally parallel to the furrows, and distribution conveyor means comprising first and second transversely aligned chain conveyors positioned adjacent the front of said bin means and each including a generally horizontal conveyor leg defining its inner extent from which it feeds outwardly and an upwardly inclined conveyor leg defining its outer extent and first and second inclined chute slide means for guiding cane segments from the outer ends of said inclined conveyor legs onto said dropping conveyors.

2. The invention of claim 1 wherein said storage bin includes as inclined flat floor portion and said removal conveyor means includes first and second longitudinally extending removal conveyor flights extending along a floor portion of said bin along the length of said bin.

3. A field operated cane planter for depositing cane seed piece segments in first and second parallel furrows, said planter comprising a movable vehicle, storage bin means on said vehicle for holding a mass of cane segments, removal conveyor means for continuously removing cane segments from said storage bin means, distribution conveyor means extending transversely of said vehicle positioned adjacent said storage bin means for receiving cane segments from said removal conveyor means and operable for conveying said cane segments to the sides of said vehicle, first and second dropping conveyors respectively extending along opposite sides of said vehicle for receiving cane segments from said distribution conveyor means and depositing the cane segments in one of said furrows and drop guide means associated with each of said dropping conveyor means for guiding said cane segments as they fall from the dropping conveyor means into the furrows to cause the cane segments to be oriented generally parallel to the furrows, said distribution conveyor means comprising first and second transversely aligned individual distribution conveyors for respectively feeding cane segments to said first and second dropping conveyors, said first and second transversely aligned individual distribution conveyors being positioned adjacent the front portion of said bin means and each including a horizontal leg defining its inner extent and an upwardly inclined conveyor leg extending out over its associated dropping conveyor and defining its outer extent and wherein each of said drop guide means comprises a flexible curtain member having spaced parallel side portions more closely spaced than the length of said cane segments and further including first and second inclined chute slide means respectively associated with said first and second distribution conveyors for guiding cane segments from the outer end of said inclined conveyor leg onto its associated dropping conveyor.

4. The invention of claim 3 wherein said bin includes an inclined floor portion and is open at its forward end and said removal conveyor means comprises first and second longitudinally extending removal conveyor flights each consisting of two parallel chains connected by transverse slats, said chains extending along said floor portion of said bin along the length of said bin and moving from rear to front over the floor of said bin.

5. The invention of claim 4 additionally including power driven cane segment untangling means positioned adjacent to the forward end of said storage bin including a transverse horizontal pivot shaft, means mounting said transverse pivot shaft for oscillation, drive means for oscillating said pivot shaft and downwardly extending kicker arms extending radially from said pivot shaft for engaging the upper portion of the body of cane segments being moved forwardly by said removal conveyor means for untangling and aiding in the directing of the cane segments into said distribution conveyor means.

6. The invention of claim 5 additionally including a rotating leveler means having a plurality of flexible radial vanes positioned for rotation above each of said dropping conveyors for deflecting cane above a given level rearwardly along said dropping conveyors so as to provide a uniform feeding of said cane segments by said dropping conveyors for deposit in the furrow.

7. The invention of claim 6 wherein said first and second inclined chute slide means has an upper end and a lower end with the lower end of each of said chute slide means being spaced more closely inwardly toward the center of the vehicle than the upper end of each of said chute slide means.

8. The invention of claim 7 additionally including power driven levelling means mounted above each of said inclined conveyor leg portions and including a rotating support member and a plurality of radially extending flexible flap members for engaging cane members extending above a predetermined level above said inclined conveyor leg portions for providing uniform flow of cane segments past said levelling means for subsequent discharge onto said chute slide member.

* * * * *